Feb. 26, 1935.  C. MONTHAN  1,992,877
LAWN SPRINKLER CONTROL
Filed Oct. 2, 1933  3 Sheets-Sheet 1
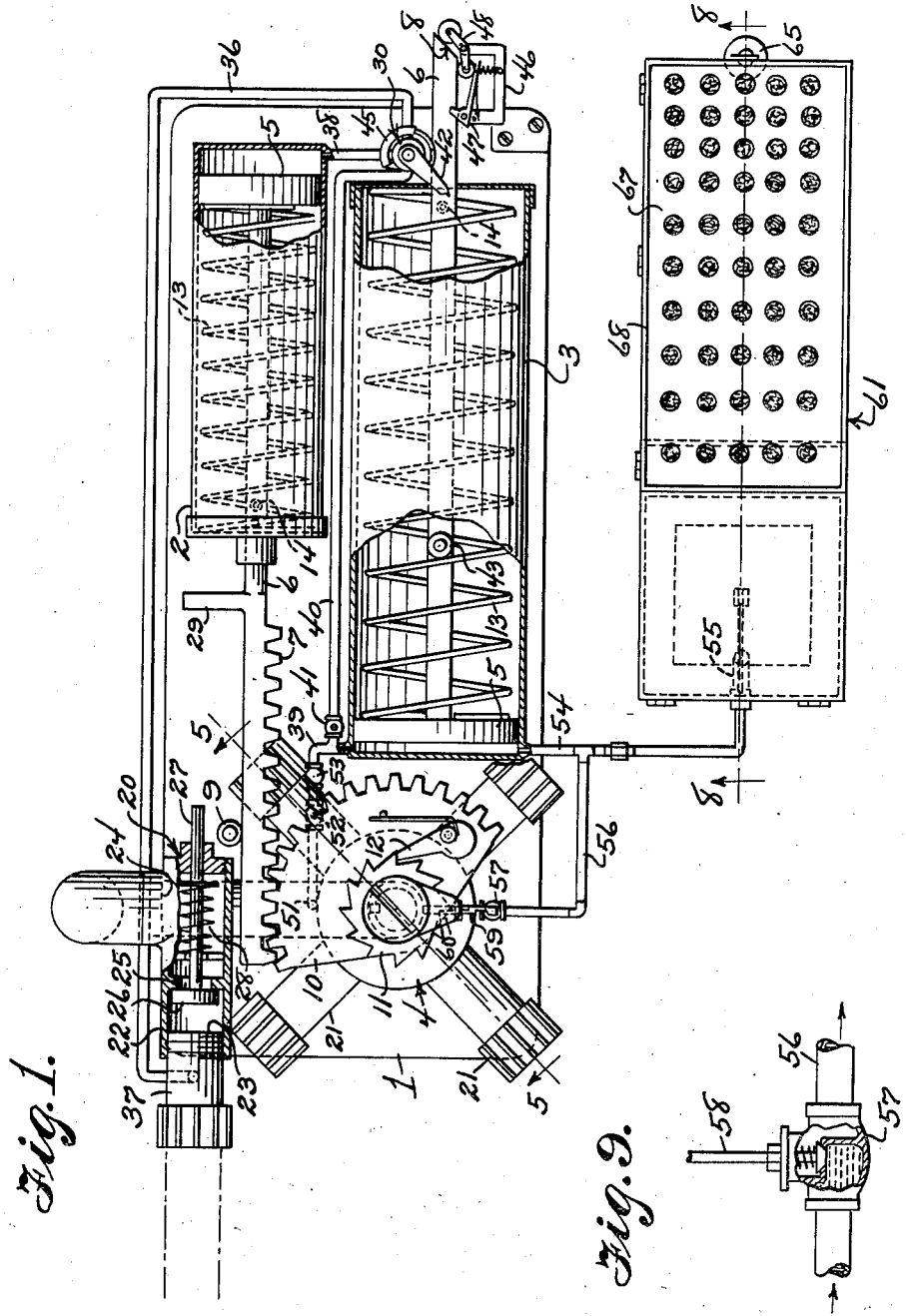
Carl Monthan
INVENTOR
BY Victor J. Evans & Co.
ATTORNEY Feb. 26, 1935.  C. MONTHAN  1,992,877
LAWN SPRINKLER CONTROL
Filed Oct. 2, 1933   3 Sheets-Sheet 2
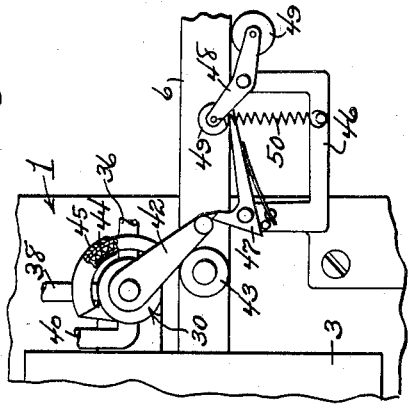
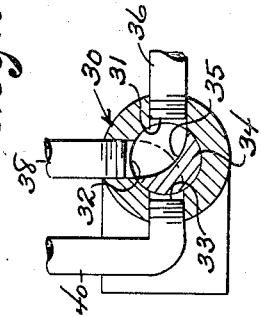
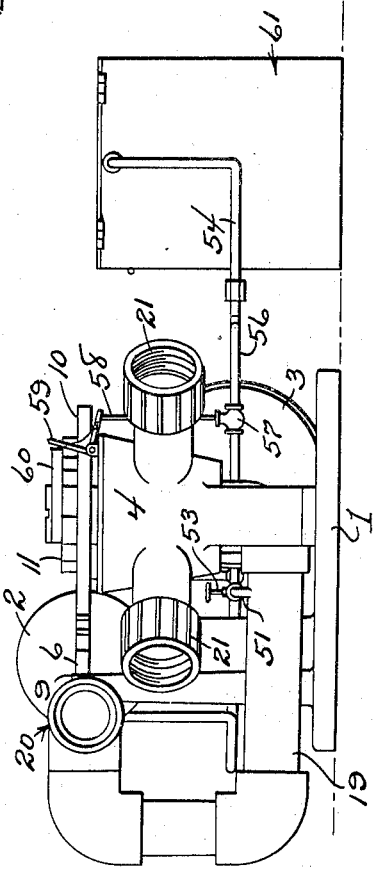
Carl Monthan
INVENTOR
BY Victor J. Evans & Co.
ATTORNEY Feb. 26, 1935. C. MONTHAN 1,992,877
LAWN SPRINKLER CONTROL
Filed Oct. 2, 1933 3 Sheets-Sheet 3
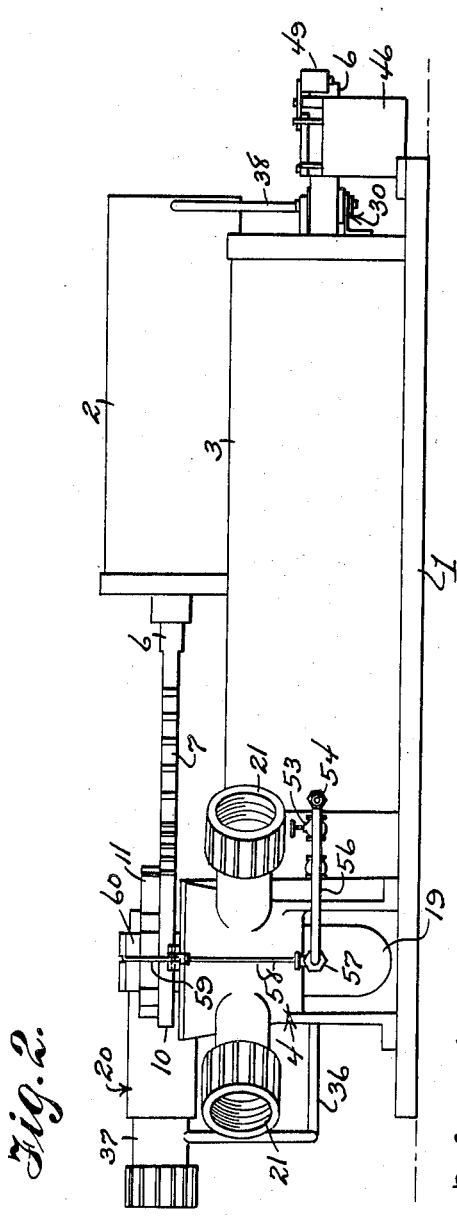
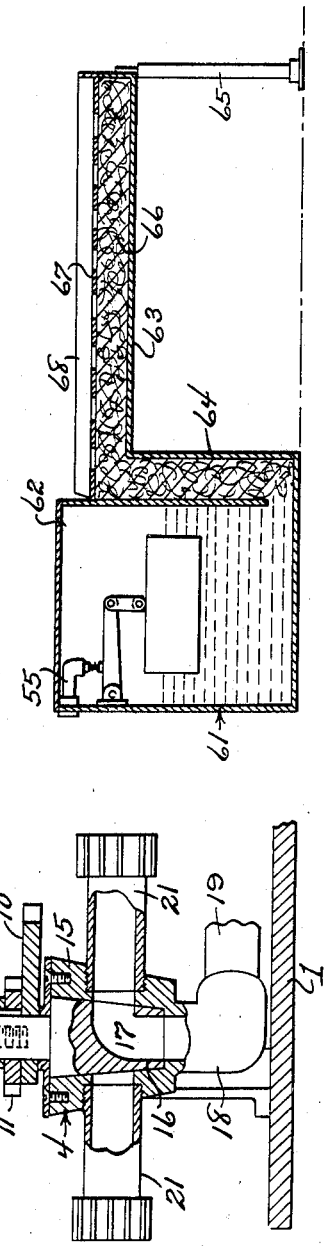
Carl Monthan
INVENTOR
BY Victor J. Evans & Co.
ATTORNEY Patented Feb. 26, 1935

1,992,877

UNITED STATES PATENT OFFICE 1,992,877

LAWN SPRINKLER CONTROL

Carl Monthan, Tucson, Ariz., assignor to Automatic Sprinklers, Inc., Tucson, Ariz., a corporation of Arizona Application October 2, 1933, Serial No. 691,848

5 Claims. (Cl. 137—145)

This invention relates to a control for sprinkler systems employed for irrigating lawns or the like to promote the growth of grass, shrubs or vegetation and has for the primary object the provision of means for automatically turning on or off the water in accordance with the need for water to support proper growth.

Another object of the invention is the provision of means for directing water to the sprinklers of the system one at a time for a predetermined length of time and then automatically close all of the sprinklers to the water supply during the non-operation of the device or when artificial irrigation is not needed.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a top plan view partly in section illustrating a sprinkler control constructed in accordance with my invention.

Figure 2 is a side elevation illustrating the same.

Figure 3 is an end elevation illustrating the device.

Figure 4 is a similar view to Figure 3 showing the other end of the device.

Figure 5 is a detail sectional view taken on the line 5—5 of Figure 1 illustrating the control valve for the sprinklers of the system.

Figure 6 is a detail view showing a trip mechanism.

Figure 7 is a detail sectional view illustrating a control valve employed in the timing mechanism.

Figure 8 is a vertical sectional view taken on the line 8—8 of Figure 1, illustrating a device for distributing water to the atmosphere and for controlling the operation of the device.

Figure 9 is a detail sectional view showing a check valve for a bypass of the device.

Referring in detail to the drawings, the numeral 1 indicates a base supporting cylinders 2 and 3 and a distributing valve 4. The cylinder 3 is larger than the cylinder 2 and said cylinders have reciprocally mounted therein pistons 5, the stems 6 thereof extend in opposite directions to each other and the stem of the piston of the cylinder 2 is formed integrally with a rack bar 7 while the stem of the piston of the cylinder 3 extends exteriorly of said cylinder and is provided with a beveled end 8. The rack bar 7 is guided in its movement by a roller 9 mounted on the base and meshes with a segment 10 journaled to the distributing valve 4. A ratchet gear 11 is secured to the movable part of the control valve and lies in close proximity to the segment 10 and is engaged by a pivoted dog 12 on the segment. The dog is spring pressed in the direction of the ratchet gear. The ratchet gear and dog 12 are adapted to impart rotation to the movable part of the valve element during the movement of the segment in one direction and are adapted to permit said segment to turn free of the movable part of the valve when moved in an opposite direction. Coil springs 13 are mounted in the cylinders between the pistons and said cylinders and the coil spring of the cylinder 2 is of a greater strength than the coil spring of the cylinder 3. The cylinders are provided with vent openings 14 on the non-working sides of the pistons.

The distributing valve consists of a housing 15 suitably mounted to the base and has rotatably mounted therein a valve element 16 of the plug type in which is formed an angular passage 17. The lower end of the valve casing 15 is provided with an inlet nipple 18 to which is connected a pipe 19 leading to a control valve 20 mounted on the base. The valve casing 15 is provided with a plurality of radially arranged outlet nipples 21 to which may be connected in the usual way sprinkler heads, not shown. The valve element 16 is given a step by step movement from the segment 10 through the ratchet mechanism for the purpose of consecutively communicating first one outlet nipple and then the other outlet nipple to the pipe 19.

The control valve 20 consists of a casing 22 having inlet and outlet ports 23 and 24, respectively. The outlet port is connected to the pipe 19 and the inlet port 23 is connected in any suitable manner to a water supply. A valve seat 25 is arranged in the casing 22 between the inlet and outlet ports to be engaged by a valve 26 of the plunger type wherein the stem 27 thereof extends outwardly of one end of the casing 22. A spring 28 normally maintains the valve 26 in engagement with the seat 25. A lug 29 is carried by the rack bar 7 and during the movement of the rack bar to operate the segment in one direction the lug engages the stem 27 and unseats the valve 26 permitting the water from the source to flow through the valve casing 22 and thence through the distributing valve 4 to the various sprinkler heads one at a time.

An automatic valve 30 has an inlet port 31 and outlet ports 32 and 33. A valve element 34 of the plug type controls said ports and has formed therein an angular passage 35 which when in one position will communicate the inlet port 31 with the outlet port 32 and when in another position will communicate the outlet ports 32 and 33 closing the inlet port to either of the outlet ports. A pipe 36 connects the inlet port 31 to the fitting 37 in the inlet port of the control valve 20 so that the inlet port 31 is in direct communication with the water supply. The outlet port 32 is connected to the cylinder 2 on the active side of its respective piston by a pipe 38. The cylinder 3 at one end thereof or the end upon the active side of its respective piston is provided with a pipe 39 to which is connected a pipe 40 that is in turn connected to the outlet port 33 of the automatic valve 30. The pipe 40 is provided with a check valve 41 adapted to prevent back pressure through the pipe 40 to the automatic valve. The automatic valve or the valve element 34 thereof carries an arm 42, the free end of which lies in close proximity to the stem of the piston of the cylinder 3 to be engaged by a lug 43 on said stem during the movement of the piston of the cylinder 3 in one direction for the purpose of shifting the position of the valve element 34 of the automatic valve. A coil spring 44 is employed to urge the arm 42 in one direction or into a position, as shown in Figure 1. In this position the inlet port 31 is in communication with the outlet port 32. The spring 44 is mounted in an arcuately shaped bracket 45. A bracket 46 is located on the base adjacent the free end of the stem of the piston of the cylinder 3 and also adjacent the automatic valve or the arm 42 thereof and carries a spring pressed and pivotally mounted catch 47. The catch is adapted to engage the arm 42 and hold the latter in a position for communicating the inlet port 31 with the outlet port 33. The arm 42 assumes this position when the piston of the cylinder 3 reaches the limit of its movement in one direction. A trip 48 is pivotally mounted on the bracket 46 and each end carries a roller 49. One roller is adapted to engage the catch 47 and the other roller to ride upon the stem of the piston of the cylinder 3 and to engage the beveled end 8 of said stem during a certain position of the respective piston. A coil spring 50 is connected to the trip 48 and to the bracket for urging the roller at one end of the trip to always contact with the stem of the piston of the cylinder 3 and also to shift the position of the catch 47 when the roller at one end of the trip engages the beveled end 8 of the stem of the piston of the cylinder 3.

A pipe 51 is connected to the pipe 19 and to the pipe 39 and has a check valve 52 adapted to prevent pressure of fluid in the pipe 39 from flowing into the pipe 19 but which will permit flow of fluid from the pipe 19 into the pipe 39 and into the cylinder 3. A manual control valve 53 is located in the pipe 51 between the check valve 32 and the pipe 39 whereby the flow of fluid from the pipe 19 to the cylinder 3 may be controlled as desired.

An outlet pipe 54 is connected with the cylinder 3 and to a float control valve 55 and also with a pipe 56 which connects with the pipe 19. A check valve 57 is located in the pipe 56 for the purpose of preventing fluid pressure from entering the pipe 54 from the pipe 19. The check valve 57 is provided with a stem 58 engaged by a bell crank lever 59 pivotally mounted on the control valve 4. The bell crank lever is spring pressed and rides against the high and low faces of a cam 60 secured to the rotatable valve element 16 of the control valve 4. The bell crank lever when in engagement with the low face of the cam has no effect on the check valve 57 and when in engagement with the high face is adapted to hold the check valve firmly on its seat and prevent direct communication between the cylinder 3 and the pipe 19.

Located adjacent the base 1 is a receptacle 61 consisting of a tank 62 and a horizontally arranged tray 63 having communication with the lower end of the tank by a vertically arranged leg or passage 64. A suitable pedestal 65 engages the free end of the tray 63 to cooperate with the tank in supporting the receptacle 61. The tank 62 has the float control valve 55 mounted therein. The tray and passage 64 are filled with absorbent material 66. The tray is closed by a perforated cover 67 surrounded by upstanding flanges 68. The float control valve 55 regulates the amount of water to the tank 62 and this water is absorbed by the material 66 and the material 66 is in contact with the atmosphere so that there will be a gradual absorption of water from the tank 62. During rain, rain water may come in contact with the material 66 for the purpose of saturating the same.

In operation, water under pressure from the supply passes through the pipe 36 to the automatic valve 30 and the latter is positioned, as shown in Figure 1, to admit the water to the cylinder 2. The pressure of water acts upon the piston 5 driving the latter to the left in Figure 1 causing a rotation of the segment 10 by the rack bar 7. The rotation of the segment 10 through the ratchet mechanism advances the valve element of the control valve one step to communicate one of the outlet nipples of the sprinkler system with the pipe 19. During the movement of the piston of the cylinder 2 the lug 29 engages the stem 27 and unseats the valve 26 placing the pipe 19 in communication with the water supply, consequently placing one of the sprinklers in operation. The manual control valve 53 having previously been set to admit a certain amount of water to the cylinder 3 within a given time and as soon as the water supply is in communication with the pipe 19 water flows into the cylinder 3 and acts upon its respective piston to drive the latter to the right in Figure 1. As the piston in the cylinder 3 advances the lug 43 engages the arm 42 of the automatic valve and shifts the latter's position so as to interrupt the flow of water to the cylinder 2 and place the latter in communication with the cylinder 3 by way of the pipes 38, 40 and 39. A further movement of the piston of the cylinder 3 positions the arm 42 to be engaged by the catch 47 maintaining the cylinder 2 in direct communication with the cylinder 3. The cylinder 3 being much larger than the cylinder 2 takes longer to fill with water and the spring of the cylinder 2 being stronger than the spring of the cylinder 3 will force the piston of the cylinder 2 towards its normal position for the purpose of expelling the water from the cylinder 2 to the cylinder 3 returning the segment and the rack bar to their normal positions. During this movement the ratchet mechanism permits the control valve to retain its former position. As the rack bar 7 returns to its initial position the valve 26 automatically seats cutting off the water supply to the pipe 19. The water in the cylinder 3 may then flow to the pipe 19 by way of the pipe 56 and also to the tank 62 for filling the latter. As soon as the cylinder 3 empties of water its respective piston is returned to its initial position resetting the automatic valve to admit water to the cylinder 2 to start the second cycle of operation. The second cycle of operation is in accordance with that previously described. These cycles of operation continue until the cam positions itself so that the high side thereof engages the bell crank lever and seats the check valve 57 which closes the pipe 19 to the pipe 56. Then the water can only escape from the cylinder 3 by way of the tank 62 and as the water can only escape from the tank 62 by absorption by the atmosphere, it will be seen that the entire device may be rendered inoperative for a considerable length of time and which time is in accordance with the need of irrigation to the growth of vegetation so that when the growth of vegetation needs further irrigation the tank 62 will have emptied allowing the float valve to drain the tank 3 repositioning the various parts, as shown in Figure 1, so that the device may again start on its first cycle of operation.

While I have shown and described the preferred embodiment of my invention, it will be understood that minor changes in construction, combination and arrangement of parts may be made without departing from the spirit and scope of my invention, as claimed.

Having described the invention, I claim:

1. A lawn sprinkler control comprising a base, a distributing valve carried by said base and adapted to be connected to a sprinkler system, a main control valve mounted on the base and connected to a fluid supply and to the distributing valve, actuating and control cylinders carried by the base, an actuating piston in said actuating cylinder, a control piston in the control cylinder, means for operating the valves by said actuating piston, an automatic valve connected to said cylinders and to the fluid supply, means for operating said automatic valve by the control piston, and an evaporation device connected to the control cylinder.

2. A lawn sprinkler control comprising a base, a distributing valve carried by said base and adapted to be connected to a sprinkler system, a self-closing main control valve mounted on the base and connected to a fluid supply, a pipe connecting the main control valve to the distributing valve, actuating and control cylinders mounted on the base, actuating and control pistons in the actuating and control cylinders, a rack bar connected to the actuating piston, a segment operated by the rack bar, a pawl and ratchet mechanism between the segment and the control valve, means on the rack bar for opening the control valve, an automatic valve connected to said cylinders and to the water supply and to said pipe, means on the control piston to operate the automatic valve, spring means for said pistons, an evaporation device, a pipe connecting the evaporation device to the control cylinder, a pipe between the first and second named pipes, and a valve in the last-named pipe and actuated by predetermined movements of the control valve.

3. A lawn sprinkler control comprising a base, a distributing valve carried by said base and adapted to be connected to a sprinkler system, a self-closing main control valve mounted on the base and connected to a fluid supply, a pipe connecting the main control valve to the distributing valve, actuating and control cylinders mounted on the base, actuating and control pistons in the actuating and control cylinders, a rack bar connected to the actuating piston, a segment operated by the rack bar, a pawl and ratchet mechanism between the segment and the control valve, means on the rack bar for opening the control valve, an automatic valve connected to said cylinders and to the water supply and to said pipe, means on the control piston to operate the automatic valve, spring means for said pistons, an evaporation device, a pipe connecting the evaporation device to the control cylinder, a pipe between the first and second named pipes, a self-closing valve in the last-named pipe, a cam operated by the control valve for opening the self-closing valve during predetermined movements of the control valve.

4. A lawn sprinkler control comprising a base, a distributing valve carried by said base and adapted to be connected to a sprinkler system, a main control valve mounted on the base and connected to a fluid supply, a pipe connecting said valves, actuating and control cylinders on the base, actuating and control pistons mounted in the actuating and control cylinders, respectively, and means for operating the control valve and the distributing valve in a step by step movement by the atcuating piston, an automatic valve connected to the cylinders and the water supply and to said pipe, means on the actuating piston to move the automatic valve in one direction, a catch for holding said automatic valve, a release effected by the movement of the actuating piston to free the automatic valve, spring means for said pistons, an evaporation device, a pipe connecting the control cylinder to the evaporation device, a third pipe connecting the second pipe to the first pipe, a self-closing check valve in the third pipe, a cam driven by the control valve, and means between the cam and self-closing check valve to hold the latter in a closed position during a given position of the control valve.

5. A lawn sprinkler control comprising a base, a distributing valve carried by said base and having a series of outlets adapted to be connected to sprinkler systems, a main control valve mounted on the base and connected to a fluid supply and to the distributing valve, a hydraulic means for operating said distributing valve, a hydraulic time controlled device for said means, and an evaporation device for rendering said hydraulic time controlled means operative and inoperative.

CARL MONTHAN.